(12) United States Patent
Stark

(10) Patent No.: US 6,708,118 B2
(45) Date of Patent: Mar. 16, 2004

(54) SYSTEM FOR UTILIZING GEOLOGIC TIME VOLUMES

(76) Inventor: Tracy Joseph Stark, 5021 Sparrows Point, Plano, TX (US) 75023

(*) Notice: Subject to any disclaimer, the term of this patent is extended or adjusted under 35 U.S.C. 154(b) by 0 days.

(21) Appl. No.: 09/952,657

(22) Filed: Sep. 12, 2001

(65) Prior Publication Data

US 2003/0018437 A1 Jan. 23, 2003

Related U.S. Application Data

(63) Continuation-in-part of application No. 09/909,694, filed on Jul. 20, 2001.

(51) Int. Cl.$^7$ ................................................. G01V 1/28
(52) U.S. Cl. ........................................................ 702/16
(58) Field of Search .............................. 702/5, 16, 14; 703/10, 2; 367/69, 73

(56) References Cited

U.S. PATENT DOCUMENTS

| | | | |
|---|---|---|---|
| 4,464,569 A | 8/1984 | Flaum | |
| 4,821,164 A | * 4/1989 | Swanson | 702/5 |
| 5,056,066 A | 10/1991 | Howard | |
| 5,153,858 A | 10/1992 | Hildebrand | |
| 5,233,569 A | 8/1993 | Beasley et al. | |
| 5,251,184 A | 10/1993 | Hildebrand et al. | |
| 5,282,384 A | 2/1994 | Holbrook | |
| 5,394,325 A | 2/1995 | Schneider, Jr. | |
| 5,513,150 A | 4/1996 | Sicking et al. | |
| 5,623,928 A | 4/1997 | Wright et al. | |
| 5,724,309 A | 3/1998 | Higgs et al. | |
| 5,838,634 A | * 11/1998 | Jones et al. | 367/73 |
| 5,870,691 A | 2/1999 | Partyka et al. | |
| 5,894,417 A | 4/1999 | Dorn | |
| 5,963,508 A | 10/1999 | Withers | |
| 5,966,672 A | 10/1999 | Knupp | |
| 5,987,125 A | 11/1999 | Stringer et al. | |
| 5,995,448 A | 11/1999 | Krehbiel | |
| 5,995,907 A | 11/1999 | Van Bemmel et al. | |
| 5,999,485 A | 12/1999 | Anstey et al. | |
| 6,011,557 A | 1/2000 | Keskes et al. | |
| 6,012,018 A | 1/2000 | Hornbuckle | |
| 6,018,497 A | 1/2000 | Gunasekera | |
| 6,018,498 A | 1/2000 | Neff et al. | |
| 6,044,328 A | 3/2000 | Murphy et al. | |
| 6,070,125 A | 5/2000 | Murphy et al. | |
| 6,078,869 A | 6/2000 | Gunasekera | |
| 6,092,026 A | 7/2000 | Bahorich et al. | |
| 6,131,071 A | 10/2000 | Partyka et al. | |
| 6,138,075 A | 10/2000 | Yost | |
| 6,138,076 A | 10/2000 | Graf et al. | |
| 6,150,973 A | 11/2000 | Pritt | |
| 6,151,555 A | 11/2000 | Van Bemmel et al. | |
| 6,201,884 B1 | 3/2001 | Van Bemmel et al. | |

OTHER PUBLICATIONS

Barbara J. Radovich and R. Burnet Oliveros; "3–D sequence interpretation of seismic instantaneous attributes from the Gorgon Field"; The Leading Edge; Sep. 1998; p. 1286–1293; 17; No. 9.

R. E. Sheriff and D. Frye and F. Koehler and M. T. Taner; "Extraction and Interpretation of the Complex Seismic Trace: Part II. Geologic Interpretation"; Geophysics; abstract from 1976 SEG meeting; p. 181; vol. 42; No. 1.

(List continued on next page.)

Primary Examiner—Donald E. McElheny, Jr.
(74) Attorney, Agent, or Firm—E. Eugene Thigpen

(57) ABSTRACT

In one embodiment the invention comprises a system for utilizing a geologic time volume to investigate a portion of the earth in which a geologic time is selected and a search is made in the geologic time volume for locations having substantially the selected geologic time. Locations in the geologic time volume having substantially the geologic time are extracted from the geologic time volume. Locations having substantially the selected geologic time may be displayed to facilitate use of the geologic time volume by an interpreter.

28 Claims, 14 Drawing Sheets

OTHER PUBLICATIONS

Umberto Spagnolini; "2–D phase unwrapping and phase aliasing"; Geophysics; Sep. 1993; p. 1324–1334; vol. 58; No. 9.

Tracy J. Stark; "Surface slice generation and interpretation: A review"; The Leading Edge; Jul. 1996; p. 818–819; 17; No. 7.

Brochure; VoxelGeo—A volume–based Visualization and Interpretation System; Paradigm Geophysical Ltd.; 1998.

Larry R. Beyer; "rapid 3–D screening with seismic terrain: deepwater Gulf of Mexico examples"; The Leading Edge; Apr. 2001; p. 386–395; 20; No. 4.

F. Koehler and M. T. Taner and R. E. Sheriff and D. Frye; "Extraction and Interpretation of the Complex Seismic Trace: Part I. Computational Procedures"; Geophysics; abstract from 1976 SEG meeting; p. 162; vol. 42; No. 1.

William A. Wescott and William N. Krebs and Paul J. Sikora and Paul J. Boucher and Jeffrey A. Stein; "Modern applications of biostratigraphy in exploration and production"; The Leading Edge; Sep. 1998; p. 1204–1210;17; No. 9.

G. F. Carballo and P. W. Fieguth; "Multiresolution Network Flow Phase Unwrapping"; International Geoscience and Remote Sensing Symposium; 2000; 3 pages.

Geoffrey A. Dorn; "Modern 3–D seismic interpretation"; The Leading Edge; Sep. 1998; p. 1262–1272; 17; No. 9.

Hongliu Zeng and Tucker F. Hentz and Lesli J. Wood; "Stratal slicing of Miocene–Pliocene sediments in Vermilion Block 50–Tiger Shoal Area, offshore Louisiana"; The Leading Edge; Apr. 2001; p. 408–418; 20; No. 4.

P. R. Vail and R. M. Mitchum, Jr.; "Seismic Stratigraphy and Global Changes of Sea Level, Part 1: Overview"; Seismic Stratigraphy–applications to hydrocarbon exploration; AAPG Memoir 26; Dec. 1977; p. 51–52.

R. M. Mitchum, Jr. and P. R. Vail and S. Thompson, III; "Seismic Stratigraphy and Global Changes of Sea Level, Part 2: The Depositional Sequence as a Basic Unit for Stratigraphic Analysis"; Seismic Stratigraphy–applications to hydrocarbon exploration; AAPG Memoir 26; Dec. 1977; p. 53–62.

M. T. Taner and R. E. Sheriff; "Application of Amplitude, Frequency, and Other Attributes to Stratigraphic and Hydrocarbon Determination"; Seismic Stratigraphy—applications to hydrocarbon exploration; AAPG Memoir 26; Dec. 1977; p. 301–327.

Becky Leigh Wood; "Development of a Structural Framework from Seismic Reflection Data"; University of Texas Master's thesis; May 1988; p. i–xviii and p. 1–102.

E.Poggiagliolmi and A.J. Berkhout and M. M. Boone; "Phase Unwrapping, Possibilities and Limitations"; Geophysical Prospecting; 30 ;1982; p. 281–291. Reprinted in Seismic Source Signature Estimation and Measurement; Geophysics Reprint Series No. 18; Society of Exploration Geophysicists; 1996; p.250–260.

Toshifumi Matsuoka and Tad J. Ulrych; "Phase Estimation Using the Bispectrum"; Proceedings of the IEEE; 72; 1980; p. 1403–1411. Reprinted in Seismic Source Signature Estimation and Measurement; Geophysics Reprint Series No. 18; Society of Exploration Geophysicists; 1996; p. 261–269.

J. P. Lindsey; "Measuring wavelet phase from seismic data"; (This article is based on Lindsey's 1987 Fall Distinguished Lecture, "Wavelet extraction from seismic data with no phase assumption," presented to many SEG Sections.) Reprinted in Seismic Source Signature Estimation and Measurement; Geophysics Reprint Series No. 18; Society of Exploration Geophysicists; 1996; p. 294–300.

J. P. Lindsey; "A note on phase unwrapping"; Seismic Source Signature Estimation and Measurement; Geophysics Reprint Series No. 18; Society of Exploration Geophysicists; 1996; p. 301–307. (Original contribution to this volume.).

N. S. Neidell; "Could the processed seismic wavelet be simpler than we think?"; Geophysics; vol. 56; No. 5; May 1991; p. 681–690; 7 Figs., 1 table. Reprinted in Seismic Source Signature Estimation and Measurement; Geophysics Reprint Series No. 18; Society of Exploration Geophysicists; 1996 p. 308–317.

A. P. Shatilo; "Seismic Phase Unwrapping: Methods, Results, Problems"; Geophysical Prospecting; 40; 1992; p. 211–225. Reprinted in Seismic Source Signature Estimation and Measurement; Geophysics Reprint Series No. 18; Society of Exploration Geophysicists; 1996; p. 318–332.

Umberto Spagnolini; "2–D phase unwrapping and phase aliasing"; Geophysics; vol. 58; No. 9; Sep. 1993; p. 1324–1334; 9 Figures. Reprinted in Seismic Source Signature Estimation and Measurement; Geophysics Reprint Series No. 18; Society of Exploration Geophysicists; 1996; p. 333–343.

Sven Treitel and Enders A. Robinson; "Maximum entropy spectral decomposition of a seismogram into its minimum entropy component plus noise"; Geophysics; vol. 46; No. 8; Aug. 1981; p. 1108–1115; 7 Figs. Reprinted in Seismic Source Signature Estimation and Measurement; Geophysics Reprint Series No. 18; Society of Exploration Geophysicists; 1996; p. 344–352.

J. Longbottom and A. T. Walden and R. E. White; "Principles and Application of Maximum Kurtosis Phase Estimation"; Geophysical Prospecting; 36; 1988; p. 115–138. Reprinted in Seismic Source Signature Estimation and Measurement; Geophysics Reprint Series No. 18; Society of Exploration Geophysicists; 1996; p. 270–293.

Dennis C. Ghiglia and Mark D. Pritt; Two–Dimensional Phase Unwrapping—Theory, Algorithms, and Software; Chapter 1,2 and 3; 1998; Title page and pp. x–xiv and p. 1–99; John Wiley & Sons, Inc.

Jon Claerbout; Chapter 2: Model fitting by least squares; Geophysics Exploration Mapping; Feb. 27, 1998; p. 31–66; Stanford University.

Hongliu Zeng and Stephen C. Henry and John P. Riola; "Stratal slicing, Part II: Real 3–D seismic date"; Geophysics; Mar.–Apr. 1998; p. 514–522; vol. 63; No. 2.

Hongliu Zeng and Stephen C. Henry and John P. Riola; "Stratal slicing, Part I: Realistic 3–D seismic model"; Geophysics; Mar.–Apr. 1998; p. 502–513; vol. 63; No. 2.

\* cited by examiner

SYSTEM FOR UTILIZING GEOLOGIC TIME VOLUMES

CROSS REFERENCE TO RELATED APPLICATIONS

This patent application is a Continuation-in-Part U.S. patent application Ser. No. 09/909,694, having a filing date of Jul. 20, 2001, and titled "System for Multi-Dimensional Data Analysis".

BACKGROUND OF THE INVENTION

1. Field of the Invention

This invention is related to seismic data processing. More specifically, the invention relates to a system for organizing seismic data.

2. Background

Geophysical and geologic study of the subsurface structure of the earth continues to be an important field of endeavor for several reasons. The continued search for producing reservoirs of hydrocarbons, such as oil and gas, is a particularly important motivation for obtaining information about the earth's subsurface.

Conventional seismic surveying is generally performed by imparting energy to the earth at one or more source locations, for example, by way of a controlled explosion, mechanical impact or the like. Return energy is then measured at surface receiver locations at varying distances and azimuths from the source location. The travel time of energy from source to receiver, via reflections and refraction from interfaces of subsurface strata is indicative of the depth and orientation of the subsurface strata.

The generation of instantaneous phase sections derived from seismic data is referred to in an article by Taner and Sheriff included in AAPG Memoir 26 from 1977, in which it is stated:

"The instantaneous phase is a quantity independent of reflection strength. Phase emphasizes the continuity of events; in phase displays . . . every peak, every trough, every zero-crossing has been picked and assigned the same color so that any phase angle can be followed from trace to trace." And "Such phase displays are especially effective in showing pinchouts, angularities and the interference of events with different dip attitudes."

Various phase unwrapping techniques are known, including those disclosed in Ghiglia, Dennis C. and Pritt, Mark D., *Two-Dimensional Phase Unwrapping Theory, Algorithms, and Software,* John Wiley & Sons, Inc., New York, N.Y., 1998. Methods of obtaining topography from synthetic aperture radar data have also used phase unwrapping techniques.

A long felt need continues to exist, however, for improved systems for organizing, storing and displaying seismic information to assist in the analysis and interpretation of the subsurface structure and geology.

SUMMARY OF THE INVENTION

In one embodiment the invention comprises a system for utilizing a geologic time volume to investigate a portion of the earth in which a geologic time is selected and a search is made in the geologic time volume for locations having substantially the selected geologic time. Locations in the geologic time volume having substantially the geologic time are extracted from the geologic time volume. Locations having substantially the selected geologic time may be displayed to facilitate use of the geologic time volume by an interpreter.

In accordance with one embodiment of the invention, the interpreter simply points to a location and the horizon closest to that location is extracted from the geologic time volume and displayed as a map view or as a three dimensional (3D) visualization display.

DESCRIPTION OF THE PREFERRED EMBODIMENT

Figure 1:
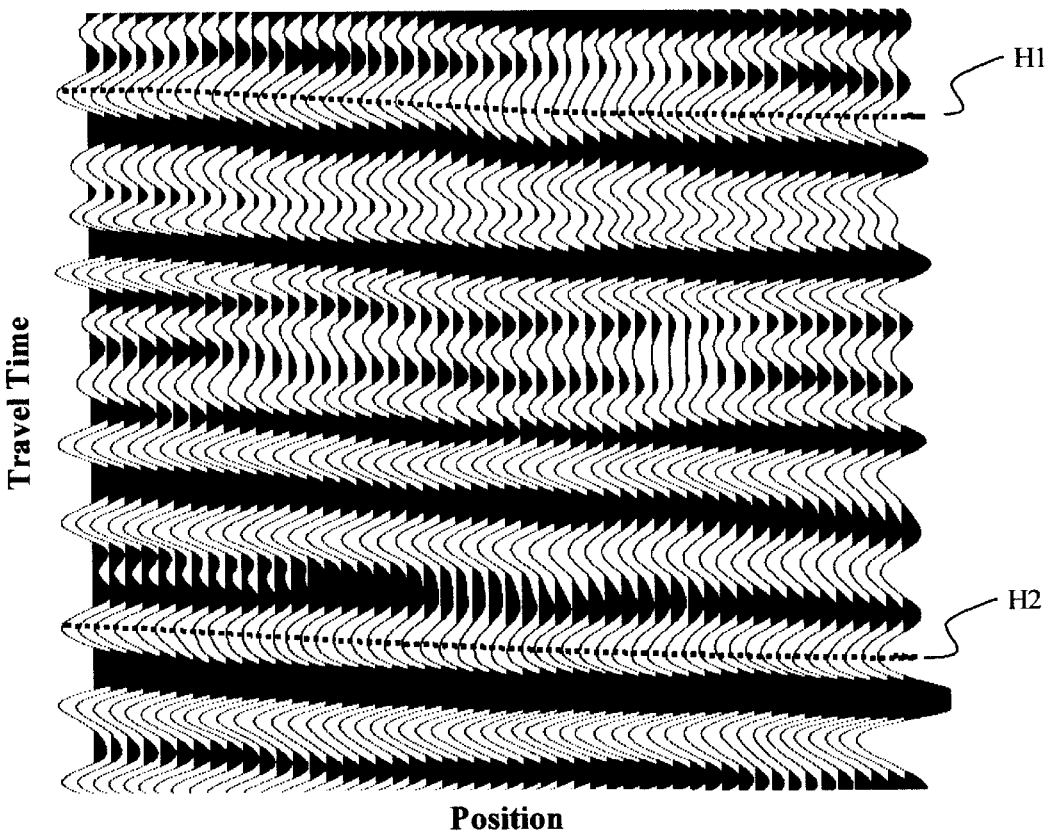
FIG. 1 shows a representative seismic data section.

FIG. 1 shows a representative seismic data section. For clarity, a two dimensional seismic data section is shown, although the invention described herein is applicable to three dimensional (3D) seismic data as well as to two dimensional (2D) seismic data, and the invention will be described herein primarily with reference to a 3D seismic data volume. Although the seismic data traces shown in FIG. 1 are shown as continuously sampled in the travel time direction, those of ordinary skill in the art will recognize that each seismic data trace is recorded by sampling the reflected seismic energy at discrete sample times at intervals typically ranging from 1 to 4 milliseconds.

The invention comprises a method of extracting surfaces of constant geologic time (sometimes referred to herein as "horizons") from a geologic time volume. Such horizons are indicated in FIG. 1 as H1 and H2. In a geologic time volume, geologic times at which sediment was deposited corresponding to the travel time (or depth) of sample points of seismic data traces are stored in memory locations on a data storage medium. The goal of generating a geologic time volume is to have a representation of geologic time for every sample point in a seismic data volume.

Typically, in generating a geologic time volume from a seismic data volume, the geologic time volume will have the same spatial dimensions as the seismic data volume. Each x, y and z data point in the seismic data volume (where x and y represent the in-line and cross line directions and z represents the travel time or depth) will have a corresponding point in the geologic time volume. The seismic data volume might typically include 2000 cross line and 2000 in-line data samples, and may extend for a depth of greater than 3000 time samples. The difference between the geologic time volume and the seismic data volume is that the value of the data point in the geologic time volume will be related to geologic time, rather than reflection amplitude (or other measured or calculated seismic attribute value).

Although a geologic time volume will typically be coextensive in space with a seismic data volume and/or a seismic attribute volume, data compression techniques may have been used in generating the geologic time volume, and uncompression techniques may be required to regenerate data points from the geologic time volume which correspond to data points in the seismic data volume.

The term "extracting" a horizon refers to marking or identifying the x-y-z positions of a horizon such that it can be distinguished from locations around the horizon that are not considered part of the horizon. The results of the extraction may be displayed on a computer screen, or be put into a storage medium for use by another computer program. The extraction may also be a visual extraction in which a display is generated in which the desired horizon is visually distinct from surrounding data points.

U.S. patent application Ser. No. 09/909,694, having a filing date of Jul. 20, 2001, which patent application is incorporated herein by reference for all purposes, discloses methods for generating geologic time volumes. The geologic time volume data are normally stored on a computer storage medium, such as a magnetic or optical disk, magnetic tape, computer random access memory or other storage media which may be read by a computer.

Figure 2:
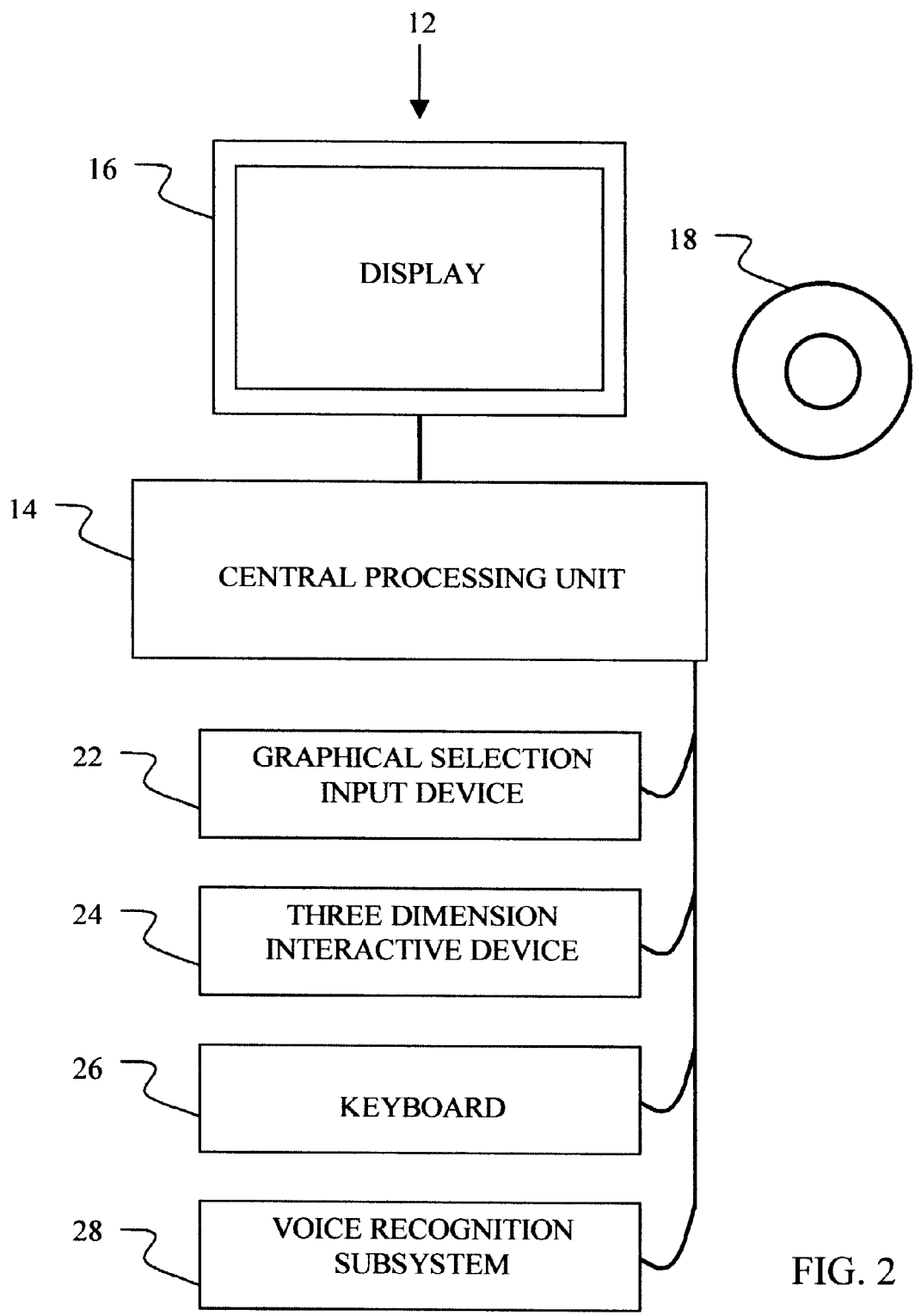
FIG. 2 shows a computer system useful for practicing the invention.

The process of the invention disclosed herein is most conveniently carried out by writing a computer program to carry out the steps described herein on a work station or other conventional digital computer system of a type normally used in the industry. Data are entered into, and retrieved from the geologic time volume, and other operations performed on the geologic time volume by a suitable computer system, such as a personal computer or UNIX workstation. The generation of such a program may be performed by those of ordinary skill in the art based on the processes described herein. FIG. 2 shows such a conventional computer system 12 comprising a central processing unit 14, a display (monitor) 16 and various peripheral devices. The computer program for carrying out the invention will normally reside on a storage media (not shown) associated with the central processing unit. Such computer program may be transported on a CD-ROM, a magnetic tape or magnetic disk, an optical disk, or other storage media, shown symbolically as storage medium 18.

Figure 3:
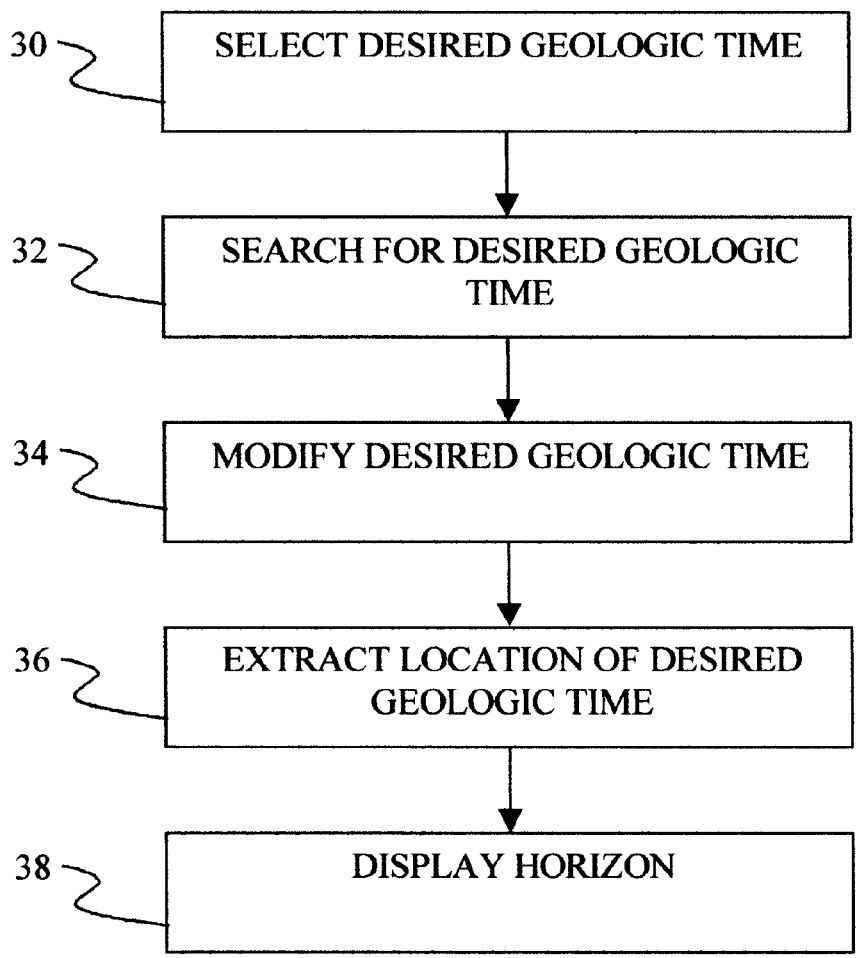
FIG. 3 is a flow diagram of an embodiment of the invention.

With reference to FIG. 3, in step 30, a horizon to be extracted from the geologic time volume is identified. The horizon to be extracted from the geologic time volume may be identified by initially selecting the desired geologic time for the horizon. The horizon to be extracted from the geologic time volume may also be identified by specifying an x-y-z location of a point on the horizon and using the geologic time of that x-y-z point in the geologic time volume as the desired geologic time of the horizon. Once the desired geologic time has been identified (either directly or by specifying an x-y-z location), a search is performed in step 32 for x-y-z locations in the geologic data volume having the desired geologic time. Note that the desired geologic time may be modified after it is initially identified, as further described herein.

For the embodiment in which an x-y-z location is utilized to identify a horizon, there are a number of ways of providing the x-y-z location to the computing system 12, including but not limited to the following:

- The x-y-z location could be provided by pointing and/or clicking with a graphical selection input device 22 (e.g. mouse) on a desired location on a display of seismic or attribute data.
- The x-y-z location could be provided by dragging a graphical selection input device 22 over a seismic section, and updating the location sensed by input device mouse at some user specified interval of either time (clock time), mouse movement, or change in the seismic data (e.g. geologic time, or seismic data phase).
- The x-y-z location could be provided by obtaining a position in three dimensional space with an appropriate interaction device 24, known to those of ordinary skill in the art.
- The x-y-z location could be provided by designating the intersection of a displayed in-line, cross line and time slice of a seismic data section or a seismic attribute section as the x-y-z location,
- The x-y-z location could be provided by specifying selected increments along the intersection of two seismic data or seismic attribute planes (e.g. an in-line and cross line intersection),
- The x-y-z location could be provided by incrementing along the path of a well bore,
- The x-y-z location could be provided by incrementing a previously specified point by a user specified value,
- The x-y-z location could be provided by reading the point from a file, stored on a storage device,
- The x-y-z location could be provided by obtaining the point from a graphical user interface such as a slider bar (or set of slider bars),
- The x-y-z location could be typed into a dialog box displayed on computer monitor 16 from a keyboard 26,
- The x-y-z location could be provided by a voice command to a voice recognition subsystem 28,
- The x-y-z location could be provided by selecting the point from a predetermined list of points, or
- The x-y-z location could be provided as a variable from a program that provides locations for one or more constant geologic time surfaces.

For the embodiment in which a geologic time is specified, there a number of ways of providing the selected geologic time to the computing system 12, including but not limited to the following:

- The geologic time could be read by the computer 12 from a file, such as a text file, stored on a storage device.
- The geologic time could be typed into a dialog box displayed on computer monitor 16 from a keyboard 26.
- The geologic time could come from a graphical user interface, such as a slider bar or push button.

The geologic time could be selected from a list of times, which may be displayed on the computer monitor 16.

The geologic time could be input by a voice command via voice recognition subsystem 28.

The geologic time could result from picking from a list a horizon name that has been associated with a geologic time.

The geologic time could be selected by a program that requests one or more constant geologic time surfaces.

The geologic time could come from a specified x-y-z location as previously discussed. or The geologic time could be provided as a variable from a program that provides locations for one or more constant geologic time surfaces.

As stated above, once the desired geologic time has been identified (either directly or by specifying an x-y-z location), a search is performed for x-y-z locations in the geologic data volume having the desired geologic time. In order to extract the horizon having the desired geologic time, typically, a vertical search is made along selected x-y traces of the geologic time volume until the geologic time which is closest to the desired geologic time is located in each selected trace. Typically, a search is performed along each x-y trace in the geologic time volume for which there is geologic time data present.

An interpreter may prefer a horizon that intersects a particular part of a seismic wavelet (such at the peak, trough or zero crossing), and for that reason an x-y-z location may be selected from a seismic data volume which is on the desired event, as the x-y-z input to the geologic time volume. With reference to step 34 of FIG. 34, the geologic time of the horizon may also be modified after the desired geologic time is located in the geologic time volume as explained hereinafter.

Methods for searching for the desired geologic time in a geologic time volume include but are not limited to the following: The first method is to perform a vertical search for the desired geologic time. The search may start with the youngest geologic time included in the geologic time volume and proceed downward in time, or start with the oldest geologic time and proceed upward in time, or the search may start with an arbitrary time and proceed in the direction of the desired geologic time. Once the search has begun, and the desired geologic time is found at a z location on a particular trace, the search may continue on an adjacent trace, starting with the corresponding z location on that trace. In some instances more than one vertically adjacent sample will have the same geologic time, in which case either the first or last sample will normally be used. Either the first or last sample may be chosen, but the choice should be consistent with the way the geologic time sample was generated. For example, if the geologic time volume was built such that the vertically adjacent samples with the same value were below the actual horizon of constant time, then the top (first) such sample would be selected. The search may also start at the location of the constant geologic time surface previously extracted from the geologic time volume and proceed in the direction of the desired new surface of geologic time. The direction of search will depend on whether the desired new surface of constant geologic time is older or younger than the previously extracted surface of constant geologic time.

In the first method, in which a vertical search for the desired geologic time is performed, typically, at least one travel time (or depth) number will be returned for each in-line, cross line point in the survey. It may be useful to return not only the travel time (or depth) location, but also the value of geologic time found at that location. A large difference in the geologic time returned and the geologic time requested, is typically an indication of the presence of an unconformity or a fault. A maximum permissible variation in the geologic time may also be provided with the specified geologic time, and those points which do not have a geologic time within the specified boundaries may be denoted with a special discontinuity value. When a horizon is displayed as described herein, locations with this discontinuity value could be displayed in some distinctive manner, such as black or transparent.

The location of the desired geologic time may not be fall exactly on a sample point in the geologic time volume. In performing such a vertical search, typically two vertically adjacent samples will be identified, one that is younger and one that is older than the desired geologic time. The position of the desired geologic time can be interpolated from these two points with or without using the neighboring points to aid in the interpretation. Alternatively, the closest point can be used. "Closest" can be measured either in geologic time or distance, or it might be either the younger or older event that is closest in distance to the provided x-y-z location. A closest measurement might also be based on some aspect of the seismic data or attribute data.

In another embodiment, in step 36, a constant geologic surface may be visually extracted by loading the geologic time volume into a volume visualization routine and varying the opacity of the geologic time volume to highlight the horizon or horizons of interest. For example, the opacity may be adjusted such that all locations having geologic times less than the desired geologic time are transparent, and all locations having geologic times greater than the desired geologic time are opaque. As used herein the term "opaque" is meant to include semi-opaque or partially opaque, so as to be visually distinguishable from a region which is transparent. Alternatively, the opacity may be adjusted such that all locations having geologic times greater than the desired geologic time are transparent, and all locations having geologic times less that the desired geologic time are opaque. The boundary between the opaque parts and transparent parts will define the desired surface(s) of constant geologic time. This second method may be especially effective when the desired geologic time is in an area with thrust faults and/or overturned beds. In such an area, surfaces of constant geologic time are often multi-valued and may be composed of several surface segments. Portions of the surface can occupy the same x-y location but each segment will have distinctly different z values. Alternatively, all geologic times not equal to, or not within a small range of the desired geologic time may be made transparent, so that only the location of the selected surface will be opaque. If a fault or an unconformity cuts the selected surface, that part of the surface will be transparent and will be represented by a hole or a gap. In general, the boundary between the opaque parts and transparent parts will define the desired surface(s) of constant geologic time, and data defining the boundary may be stored in a data storage medium for further use.

Regardless of which process is used for identifying the desired horizon in the geologic time volume, the x-y-z locations of each identified point of the horizon and the geologic time associated with each such identified point are typically extracted, in step 36, from the geologic time volume and the data defining the horizon are loaded into a file or an array for further use, including use in visualization routines. It is understood that a plurality of horizons may be extracted from a geologic time volume.

Although the interpreter may typically specify an x-y-z location, or specify a desired geologic time for a surface of constant geologic time, the interpreter may desire to modify the desired geologic time in order to obtain a horizon that goes through a specific phase of the seismic wavelet (such as the peak, trough, or zero crossing or other seismic attribute value of the seismic signal) that is closest to the desired x-y-z location or the desired geologic time.

In a first method of modifying the geologic time, after an x-y-z location of the desired geologic time is identified in the geologic time volume (the "initial location"), the corresponding location is identified in the seismic data volume, and a vertical search is performed to identify the location (the "modified location") of the desired specific phase of the seismic wavelet closest to this corresponding location. The geologic time of this modified location is then utilized to extract the surface of constant geologic time (horizon) from the geologic time volume.

In a second method of modifying the geologic time, after the desired geologic time is identified in the geologic time volume, locations of the desired geologic time are identified throughout the geologic time volume to define the desired horizon. Locations are then identified in the seismic data volume corresponding to each of the locations of the desired geologic time identified in the geologic time volume. Typically, a vertical search is performed on each trace to identify the locations (the "modified locations") of the desired specific phase of the seismic wavelet closest to each of these corresponding locations in the seismic data volume. These modified locations then define the desired horizon. For poorer quality geologic time volumes this second method may yield better results.

In order to obtain an indication of the data quality, after the modified locations are identified in this second method of modifying the geologic time, locations in the geologic time volume corresponding to the modified locations may be identified and the geologic times of each of these corresponding modified locations may be determined. The amount of variance in the determined geologic times of these modified locations can be used as an indication of the data quality.

After the horizon has been extracted from the geologic time volume it will normally be desirable to display the horizon, in step 38, in a manner to facilitate use of the information by a seismic interpreter. A number of data display methods may be utilized. One method is to show two dimensional gray scale or color-coded maps. A second method is to show the horizon in a three dimensional perspective or orthonormal projection. The surface may also be visually extracted by displaying the surface locations differently than the adjacent locations not considered part of the horizon. For example the surface may be viewed by using opacity filtering on the geologic time volume as previously described, or by use of the geologic time volume to opacity filter a seismic data or a seismic attribute volume.

Figure 4:
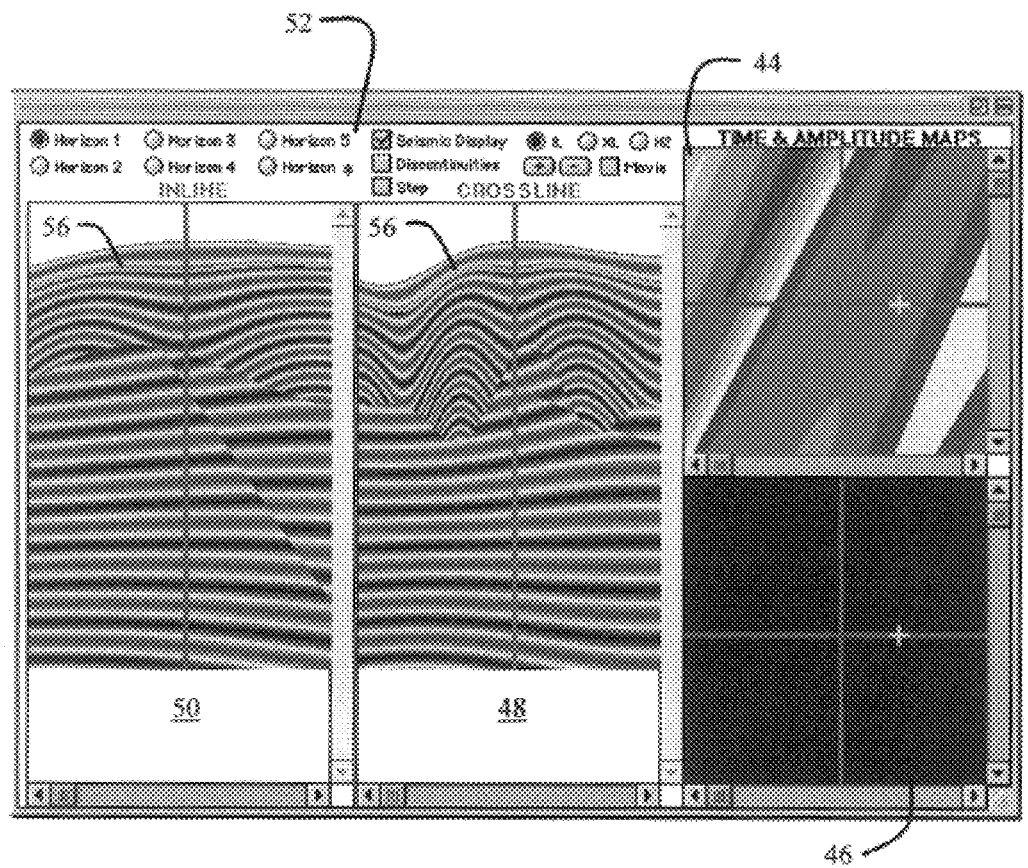
FIG. 4 is a two dimensional map illustrating results of the invention.
Figure 5:
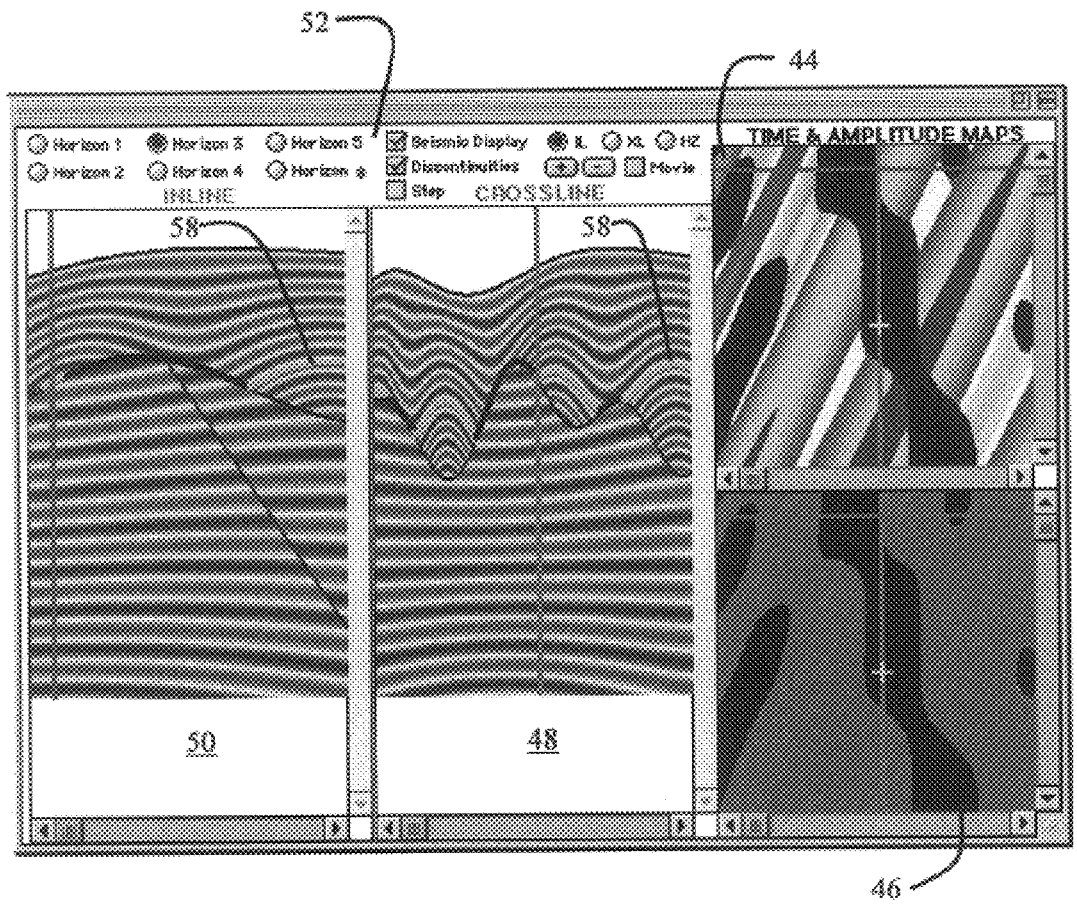
FIG. 5 is another two dimensional map illustrating results of the invention.

FIGS. 4 and 5 show two examples of two dimensional maps. Although a gray scale is shown in FIGS. 4 and 5, color code variations may also be used advantageously. The displays of FIGS. 4 and 5 include five sections: an in-line display 50, a cross line display 48, a structural map (top) view 44 in which variations in depth of the selected horizon are shown as gray scale variations, an attribute map view 46 in which a selected attribute for the horizon (for example: amplitude, phase or various other attributes) may be shown, and a control panel section 52 which is utilized for making parameter selections.

Whenever a new horizon is selected, a gray scale (or color coded) map view and an attribute map view may be generated for the new horizon. In the examples shown, the attribute shown in the attribute map is amplitude, which is a constant for the examples shown.

The relative position of these five sections is provided as a user interface example. The relative positions of the sections could be rearranged. In addition, each section could be placed in its own graphical window. The parameter selection options displayed here are for illustration purposes.

The horizon display(s) may be changed in various ways using the available parameter selection options. The interpreter is able to select a particular horizon for display by specifying a new desired geologic time value using parameter selections, including but not limited to those described herein. The number of parameters provided for in the control panel could also be increased or decreased to provide for different methods of inputting an x-y-z location or a desired geologic time into a computing system.

Note that whenever a new desired geologic time value is selected, a programed computer extracts the new desired surface, and this new surface (and possibly a seismic attribute of interest) is displayed. The display may be in the form of a structural and/or attribute map, such as illustrated in FIGS. 4 and 5, or other suitable form. The extracted horizon will normally be in the form of a two-dimensional (x-y) array, in which the value of the displayed gray scale or the displayed color represents the z location of the extracted horizon in the structural map and the value of an attribute in the attribute map. The example illustrated herein is for a single horizon, but the method can be utilized to apply to more than one horizon.

Numbered (or labeled) push buttons, such as the push buttons labeled in FIGS. 4 and 5 as Horizon 1, Horizon 2, Horizon 3, Horizon 4 and Horizon 5, may be used to select the horizon. These buttons (or any similar graphical interface system) may be used to initiate a search of the geologic time volume using either a pre-selected x-y-z position or geologic time to extract the desired geologic time horizon.

A push button, such as the one labeled "Horizon *" in FIGS. 4 and 5 (or any similar graphical interface system), can be used to indicate to a computer program to use a pointing device, such as a mouse, to obtain an x-y-z location. For example, a computer mouse could be used to select a point on a seismic display, such as an in-line or cross line location. The program could return a new position every time a mouse button is clicked, or could continuously provide points as the mouse is moved in order to provide a continuous "movie" style presentation. A method of turning on and off the sending of the points, such as sending points with the mouse button down and stopping when the mouse button is up, may preferably be incorporated.

Another method of changing the displayed horizon is to use buttons (or similar graphical interface systems) to increment or decrement the current desired geologic time value or current position from which the desired geologic time is obtained. In the example of FIGS. 4 and 5, when the parameter selection button labeled HZ is chosen, and then either the "+" button or the "−" button is depressed, the desired geologic time value is incremented or decremented by an amount equal to a predefined geologic time step size.

Another method of changing the displayed horizon is to have a computer program change the desired geologic time value (or position from which the time is obtained) in a defined manner. In the example provided by FIGS. 4 and 5, this is accomplished by selecting the HZ selection button and then pressing the button labeled "Movie". The desired geologic time value is incremented or decremented continuously depending upon whether the "+" button or the "−"

button was depressed last, to show successive horizons in a "movie" style presentation. The desired geologic time value is changed by the current value of the geologic time step size. Pushing either of the "+" button or the "−" button will cause the geologic time value to be changed in that direction. Pressing the movie button a second time tells the program to stop changing the desired geologic time value. Another button (or similar graphic device) can be used to change the currently used geologic time step size. In the example provided by FIGS. 4 and 5, the "Step" button below the discontinuity button toggles the geologic time step size between a default coarse value and an optional fine value.

The location of a currently displayed horizon(s) can also be shown in a seismic section. In the examples shown in FIGS. 4 and 5, the horizon is designated by numeral 56 in FIG. 4, and by numeral 58 in FIG. 58 on both the in-line and cross line sections of the figures. In a color code display, the horizons may be shown as distinct colors. As the desired geologic time value changes, the location of the extracted horizon in the displayed in-line and cross line sections is updated. The displayed horizon (s) may also be shown without showing the seismic data by toggling the "Seismic Display" button to the off position.

As a quality control on the extracted horizon, the in-line and cross lines can be changed, to enable an interpreter to verity that the extracted horizons are geologically reasonable and are consistent with the seismic data. In the example provided by FIGS. 4 and 5 this is accomplished by either selecting the IL (in-line) button or the XL cross line) button, and then using the "+" button, the "−" button and the Movie button as described previously. In addition the in-line and cross line position may be selected graphically from the structural map 44 and/or the amplitude map 46. In this implementation, the in-line is selected from the structural map, and the cross line selected from the attribute map.

Locations at which the extracted geologic time has large deviations from the desired geologic time may indicate the presence of a discontinuity, and may be highlighted in some manner. For example, areas of large deviation from the specified time may be shown in black, as shown in sections 44, 46, 48 and 50 of FIG. 5. The user may also turn on or off such distinguishing highlights. One method of turning on or off such distinguishing highlights is by toggling on or off by the button labeled "Discontinuities". (FIG. 5 provides an example of a "Discontinuities" button toggled "on".) Locations at which the extracted geologic time has large deviations from the desired geologic time may also be shown in black on the in-line and cross line displays.

A second display method is to display the horizon in a three dimensional display, as previously discussed herein. As the value of the desired geologic time changes, the horizon display is changed to reflect the structure and position of the new surface of constant geologic time that corresponds to the new desired geologic time. An attribute (such as amplitude or two way travel time) can be used to color the three dimensional surface of the horizon using texture mapping or amplitude draping methods known to those skilled in the art. The value of the desired geologic time can be selected using any of the previously described methods, including incrementing along a well bore or an in-line/cross line intersection or having the desired geologic time follow the location of a pointing device such as a mouse.

In a third display method a geologic time volume is loaded into a volume visualization routine which controls a graphical display and the opacity function adjusted to make parts of the geologic time volume transparent and other parts opaque in the display. Typically, in a volume visualization program each amplitude value has an associated opacity value. Opacity values normally vary from 0.0 (transparent) to 1.0 (opaque). In the case of geologic time volumes, the amplitude corresponds to geologic time. The desired geologic time value (or multiple values) is used to define the opacity function. For example the opacity function may be zero for all values except those that correspond to the desired geologic time. As the desired geologic time is changed, this change produces a change in the opacity function, which will result in the new horizon being displayed.

Instead of setting just the opacity value of the desired geologic time, a time range can be set that is associated with the desired geologic time, for example the desired time plus 50 million years. As the desired geologic time value is now changed, the display will show a constant geologic time thickness of data whose shape will change as the geologic time value is changed.

This method can also be used to simultaneously display a plurality of constant geologic time surfaces, that can be moved in unison, keeping the geologic time difference between the horizons constant. This is done, for example, by setting the opacity to 1.0 for all of the desired geologic time surfaces, and 0.0 for all other geologic times.

In a fourth display method a seismic data volume, or a seismic attribute volume, is loaded into a volume visualization routine and the corresponding geologic time volume is used to control the opacity of the seismic data volume, or the seismic attribute volume, to make parts of the seismic data volume, or the seismic attribute volume, transparent and other parts opaque. In this method a function that relates geologic time to opacity is generated and applied to the seismic data volume or seismic attribute volume. Therefore, if a geologic time sample is transparent the corresponding seismic data, or seismic attribute, sample is transparent, and conversely, if a geologic time sample is opaque, the corresponding seismic data, or seismic attribute, sample is opaque. In this method the interpreter selects the geologic time (or times) or geologic time range which the interpreter desires to apply to the seismic data or seismic attributes. For example, the interpreter may want to look at the seismic data or seismic attributes that are between two horizons. The geologic times between these two horizons would be made opaque or semi-opaque and all other geologic times made transparent. A volume of opacity values could, accordingly, be used to display the corresponding volume of seismic data, or seismic attributes.

Figure 6:
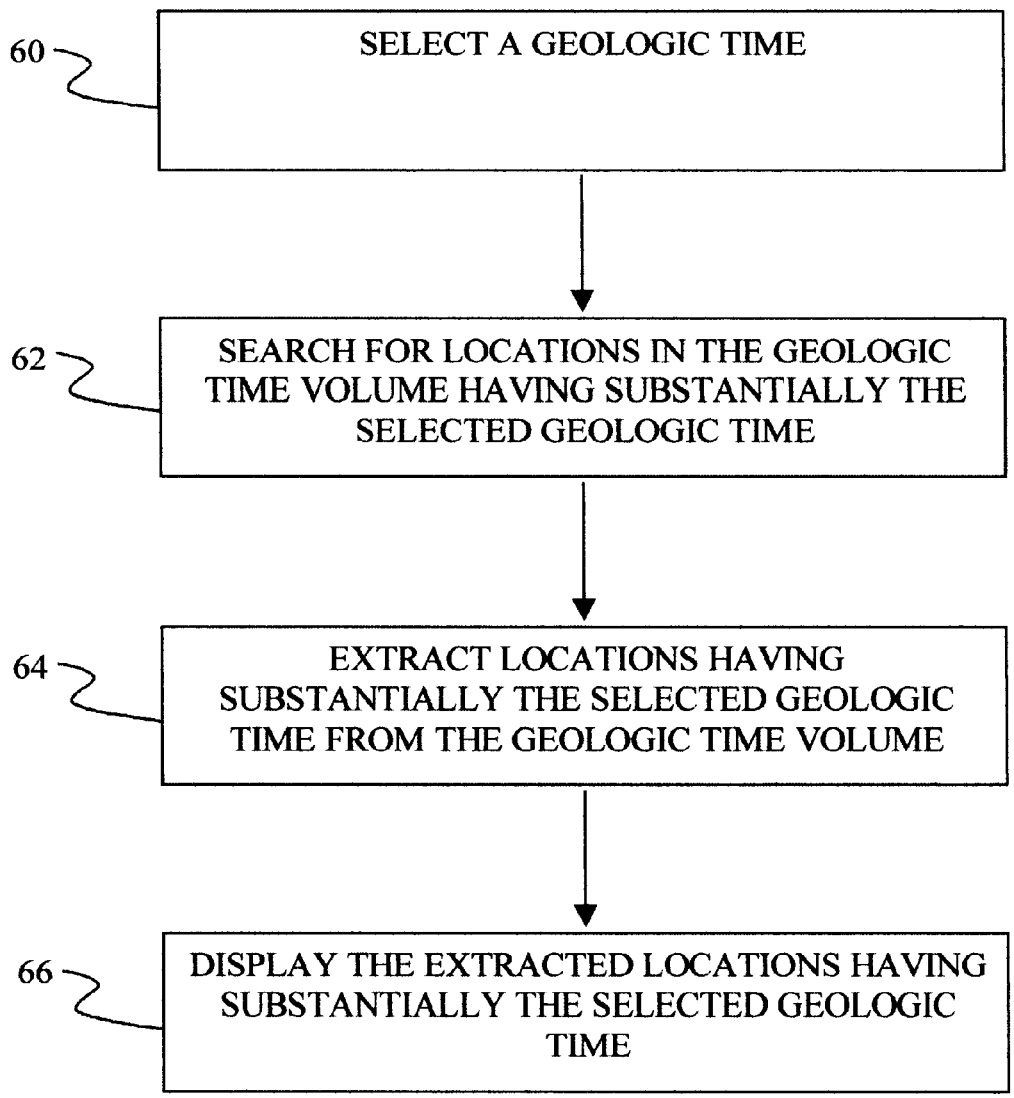
FIG. 6 is a flow chart in accordance with one embodiment of the invention, illustrating a method for utilizing a geologic time volume to investigate a portion of the earth.

With reference to FIG. 6, in accordance with one embodiment, the invention comprises a method for utilizing a geologic time volume to investigate a portion of the earth, which includes selecting a geologic time 60, searching for locations in said geologic time volume having substantially said geologic time 62 and extracting locations having substantially said geologic time from said geologic time volume 64 and displaying said extracted locations having substantially said geologic time 66.

Figure 7:
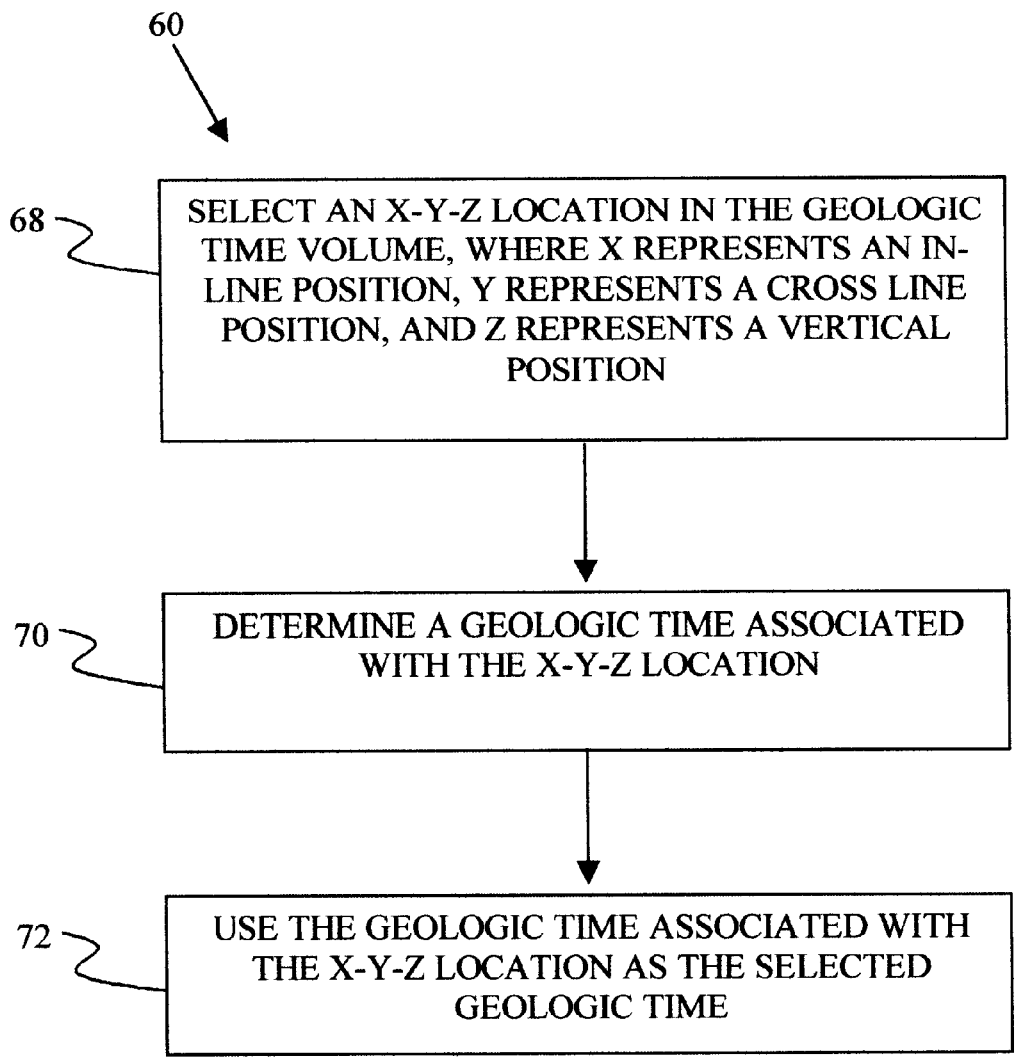
FIG. 7 is a flow chart illustrating one implementation of element 60 of FIG. 6, the selection of a geologic time.

With reference to FIG. 7, in one implementation of the embodiment of FIG. 6, selecting a geologic time 60 comprises selecting an x-y-z location in said geologic time volume, where x represents an in-line position, y represents a cross line position, and z represents a vertical position 68; determining a geologic time associated with said x-y-z location 70, and using said geologic time associated with said x-y-z location as said selected geologic time 72.

Figure 8:
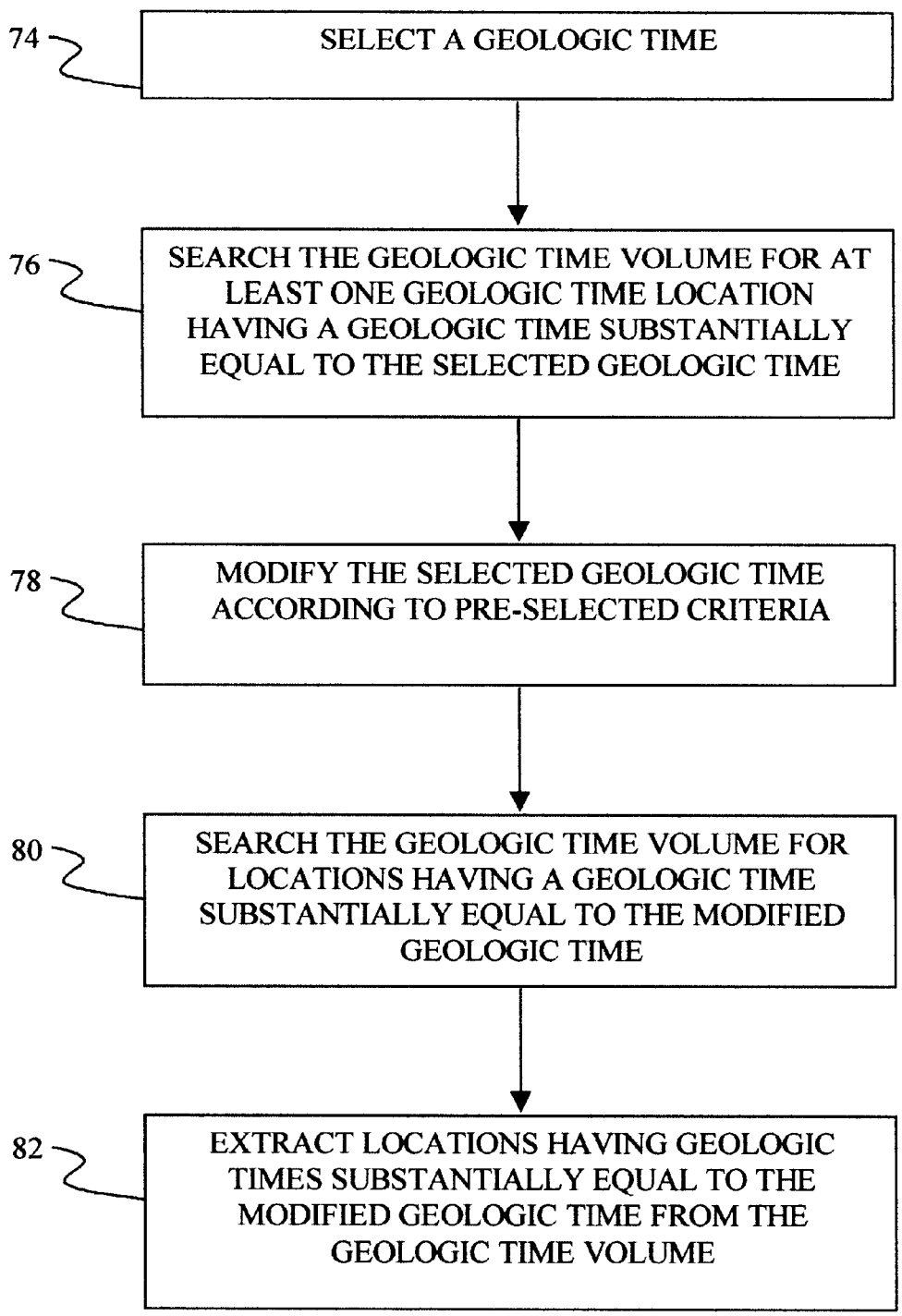
FIG. 8 is a flow chart in accordance with another embodiment of the invention, illustrating a method for utilizing a geologic time volume to investigate a portion of the earth.

With reference to FIG. 8, in accordance with yet another embodiment the invention comprises a method for utilizing a geologic time volume to investigate a portion of the earth, which includes selecting a geologic time 74, searching said geologic time volume for at least one geologic time location having a geologic time substantially equal to said selected geologic time 76, modifying said selected geologic time according to preselected criteria 78, searching said geologic time volume for locations having a geologic time substantially equal to said modified geologic time 80, and extracting locations having geologic times substantially equal to said modified geologic time from said geologic time volume 82.

Figure 9:
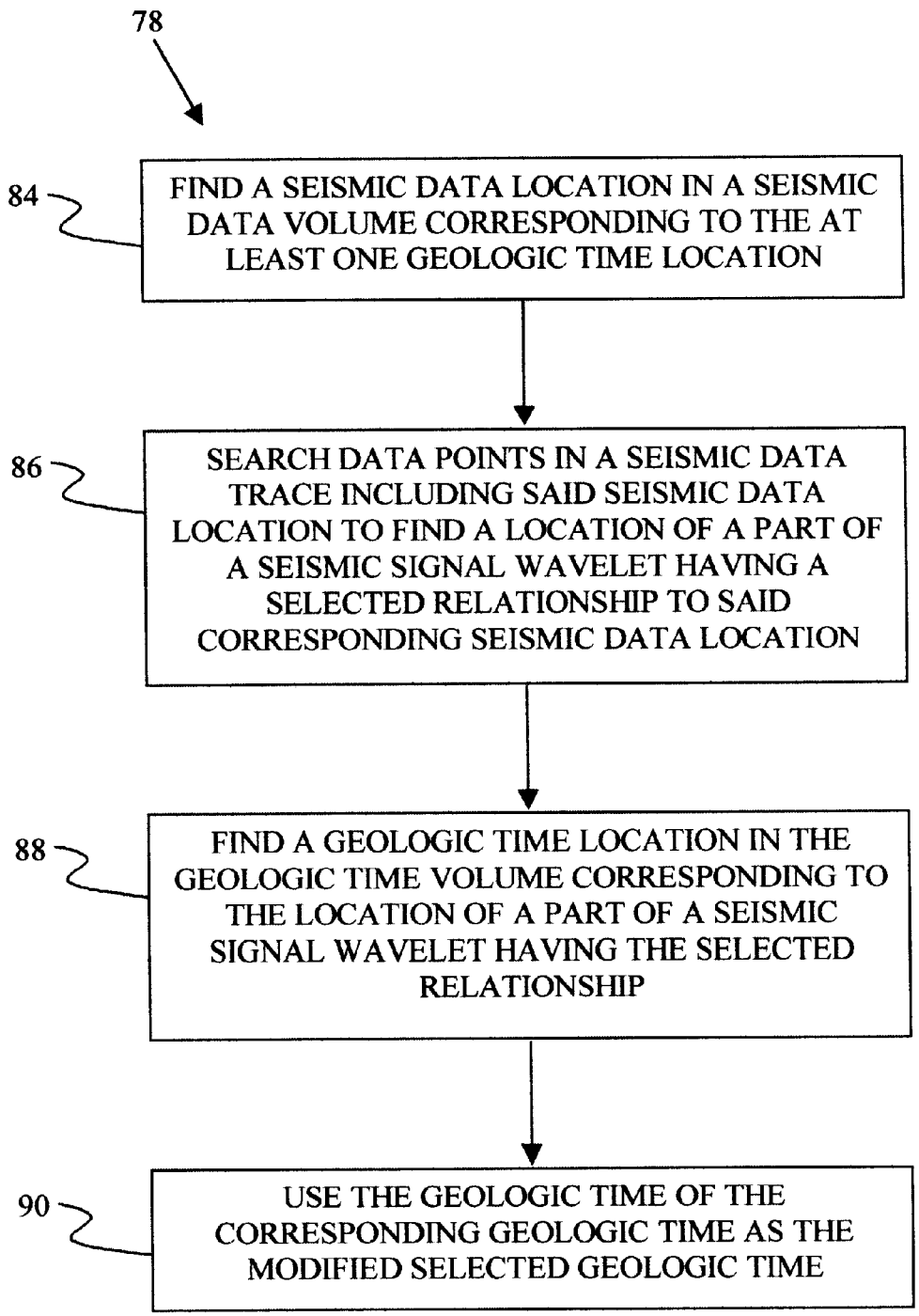
FIG. 9 is a flow chart showing an implementation of the embodiment of the invention illustrated in FIG. 8.

With reference to FIG. 9, in one implementation of the embodiment of FIG. 8, modifying said selected geologic time according to preselected criteria 78 comprises finding a seismic data location in a seismic data volume corresponding to said at least one geologic time location 84, searching data points in a seismic data trace including said seismic data location to find a location of a part of a seismic signal wavelet having a selected relationship to said corresponding seismic data location 86, finding a geologic time location in said geologic time volume corresponding to said location of a part of a seismic signal wavelet having said selected relationship 88, and using the geologic time of said corresponding geologic time as said modified selected geologic time 90.

Figure 10:
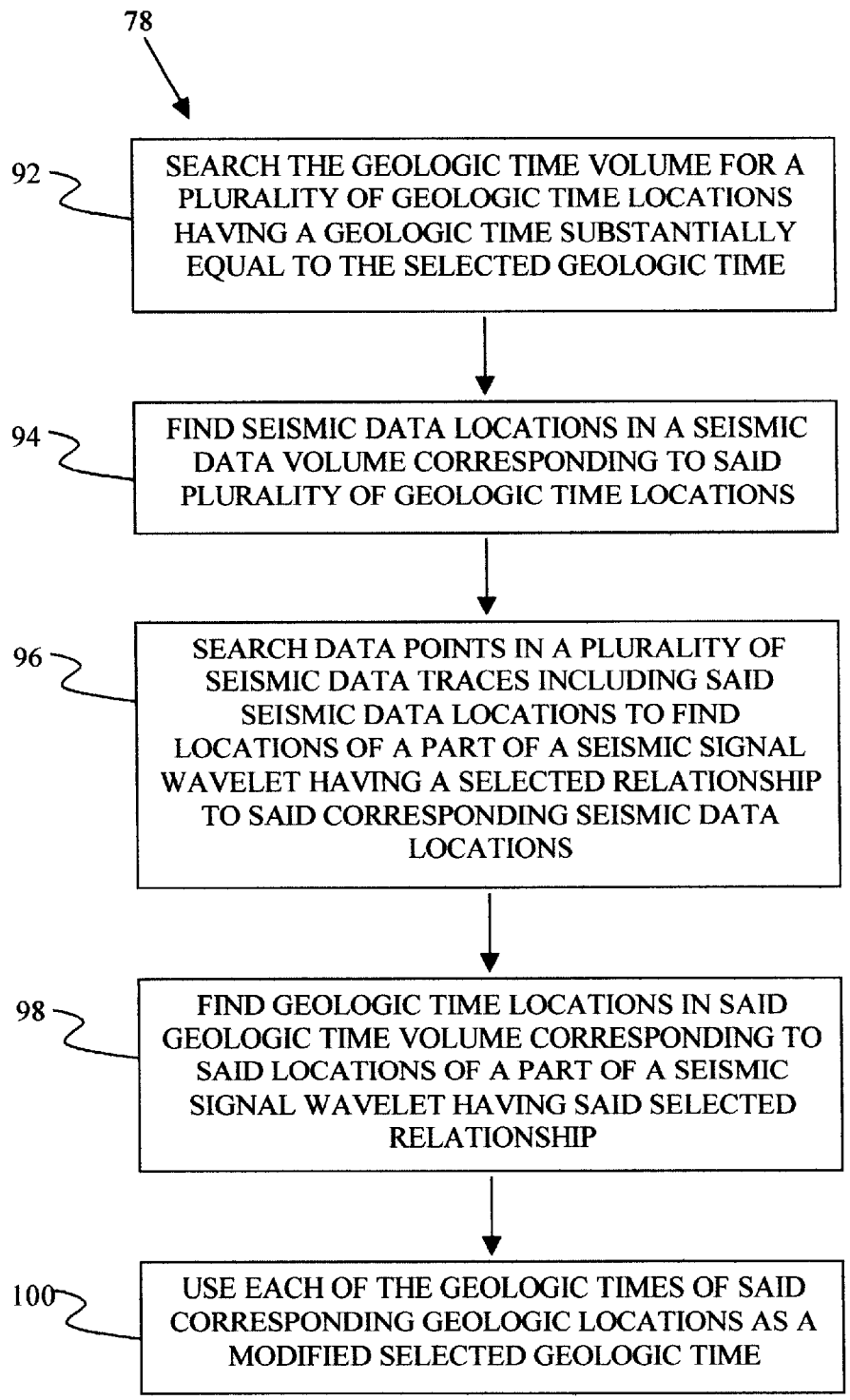
FIG. 10 is a flow chart showing another implementation of the embodiment of the invention illustrated in FIG. 8.

With reference to FIG. 10, in another implementation of the embodiment of FIG. 8, modifying said selected geologic time according to preselected criteria 78 comprises searching said geologic time volume for a plurality of geologic time locations having a geologic time substantially equal to said selected geologic time 92, finding seismic data locations in a seismic data volume corresponding to said plurality of geologic time locations 94, searching data points in a plurality of seismic data traces including said seismic data locations to find locations of a part of a seismic signal wavelet having a selected relationship to said corresponding seismic data locations 96, finding geologic time locations in said geologic time volume corresponding to said locations of a part of a seismic signal wavelet having said selected relationship 98, and using each of the geologic times of said corresponding geologic time locations as a modified selected geologic time 100.

Figure 11:
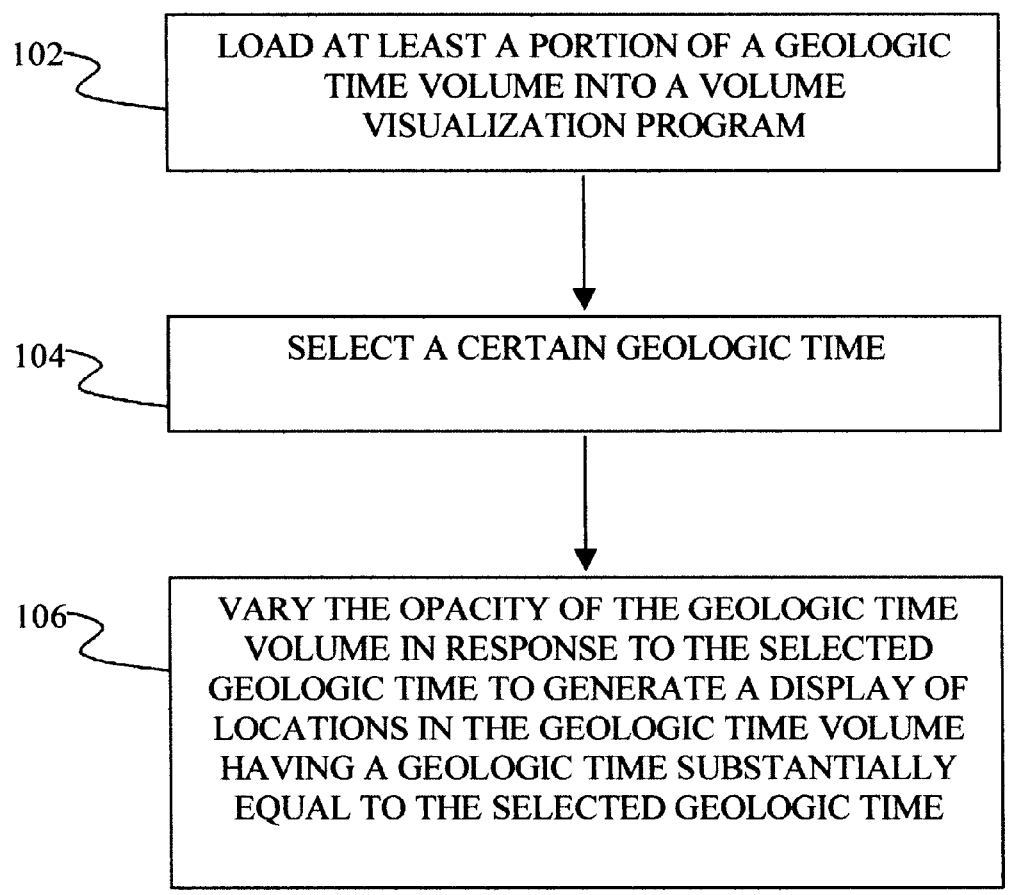
FIG. 11 is a flow chart in accordance with yet another embodiment of the invention, illustrating a method for utilizing geologic time volume to investigate a portion of the earth.

With reference to FIG. 11, in yet another embodiment the invention comprise a method for utilizing a geologic time volume to investigate a portion of the earth which includes loading at least a portion of a geologic time volume into a volume visualization program 102, selecting a certain geologic time 104, and varying the opacity of said geologic time volume in response to said selected geologic time to generate a display of locations in said geologic time volume having a geologic time substantially equal to said selected geologic time 106.

In one implementation of the embodiment of FIG. 11, varying the opacity of said geologic time volume comprises making locations in said geologic time volume transparent which are younger in geologic time than said selected geologic time and making location in said geologic time volume opaque which are older in geologic time than said selected geologic time.

In another implementation of the embodiment of FIG. 11, varying the opacity of said geologic time volume comprises making locations in said geologic time volume opaque which are younger in geologic time than said selected geologic time, and making location in said geologic time volume transparent which are older in geologic time than said selected geologic time.

In yet another implementation of the embodiment of FIG. 11, varying the opacity of said geologic time volume comprises making locations in said geologic time volume opaque which are substantially equal to said selected geologic time, and making location in said geologic time volume transparent which are not substantially equal in geologic time to said selected geologic time.

Figure 12:
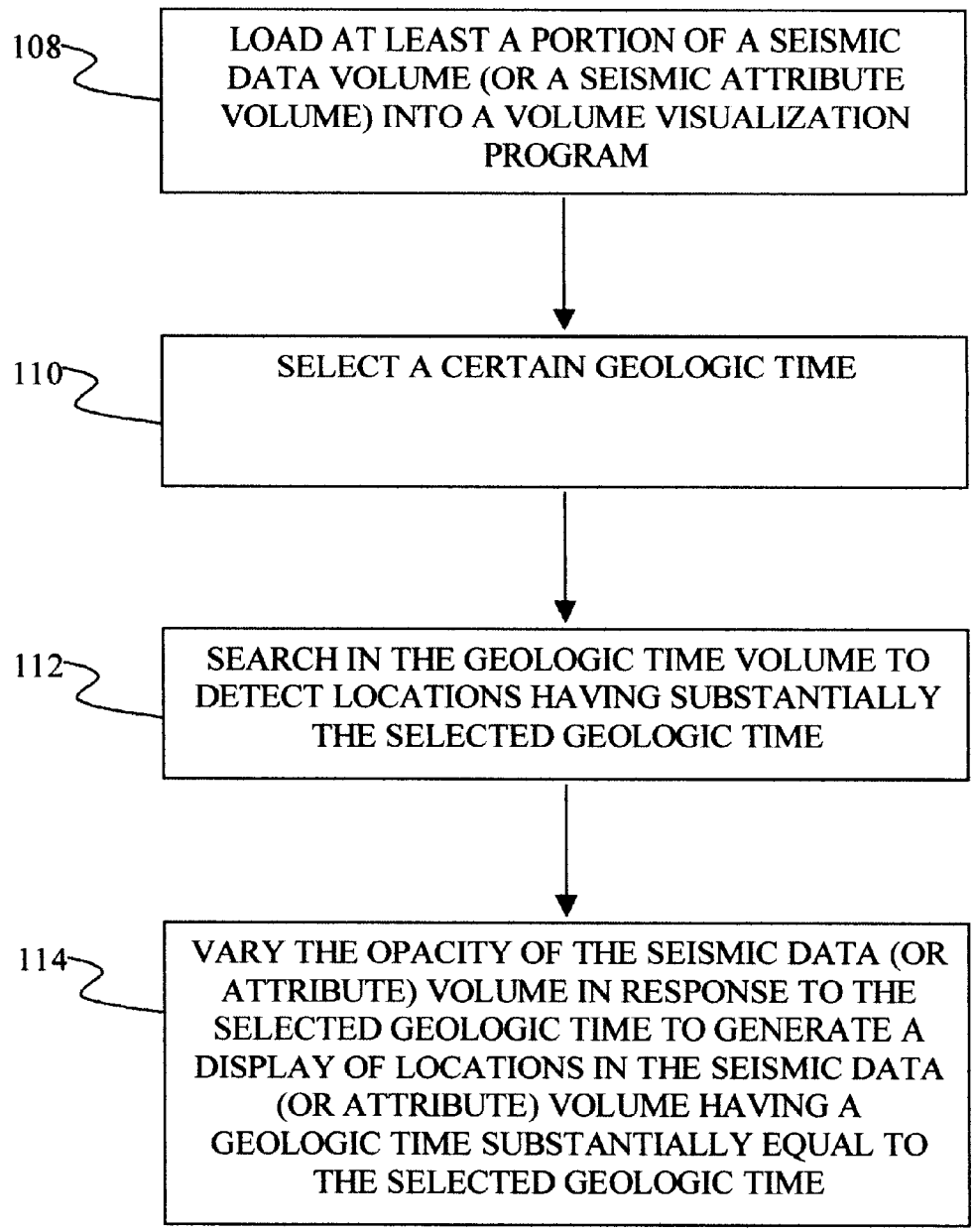
FIG. 12 is a flow chart in accordance with still another embodiment of the invention, illustrating a method for utilizing a geologic time volume to investigate a portion of the earth.

With reference to FIG. 12, in yet another embodiment the invention comprises a method for utilizing a geologic time volume to investigate a portion of the earth, which includes loading at least a portion of a seismic data volume (or a seismic attribute volume) into a volume visualization program 108, selecting a certain geologic time 110; searching in the geologic time volume to detect locations having substantially the selected geologic time 112, and varying the opacity of said seismic data volume (or said seismic attribute volume) in response to said selected geologic time to generate a display of locations in said seismic data volume (or said seismic attribute volume) having a geologic time substantially equal to said selected geologic time 114.

Figure 13:
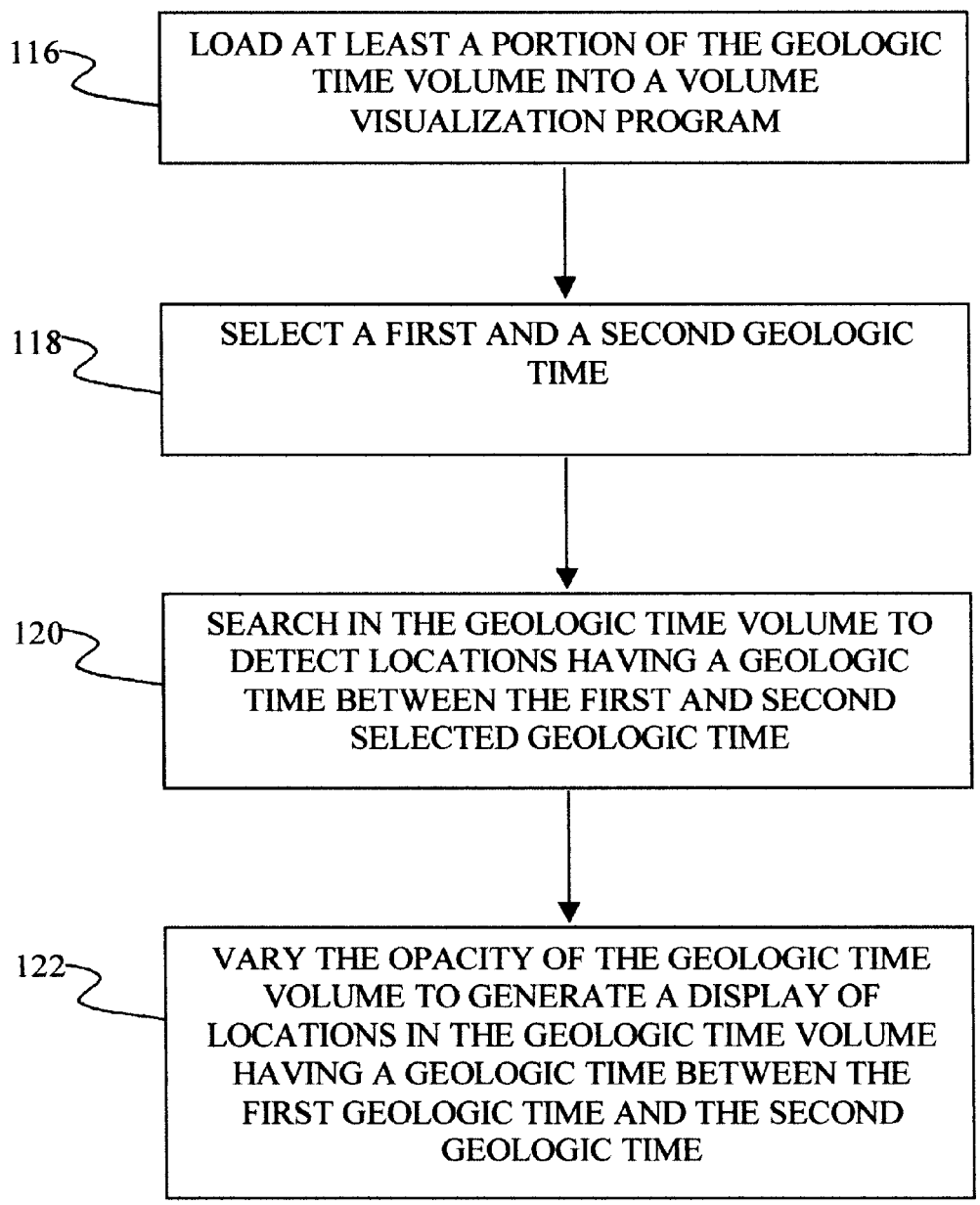
FIG. 13 is a flow chart in accordance with a further embodiment of the invention, illustrating a method for utilizing a geologic time volume to investigate a portion of the earth.

With reference to FIG. 13, in another embodiment of the invention comprises a method for utilizing a geologic time volume to investigate a portion of the earth, which includes loading at least a portion of the geologic time volume into a volume visualization program 116, selecting a first and a second geologic time 118, searching in said geologic time volume to detect locations having a geologic time between said first and second selected geologic time 120; and varying the opacity of said geologic time volume to generate a display of locations in said geologic time volume having a geologic time between said first geologic time and said second geologic time 122.

Figure 14:
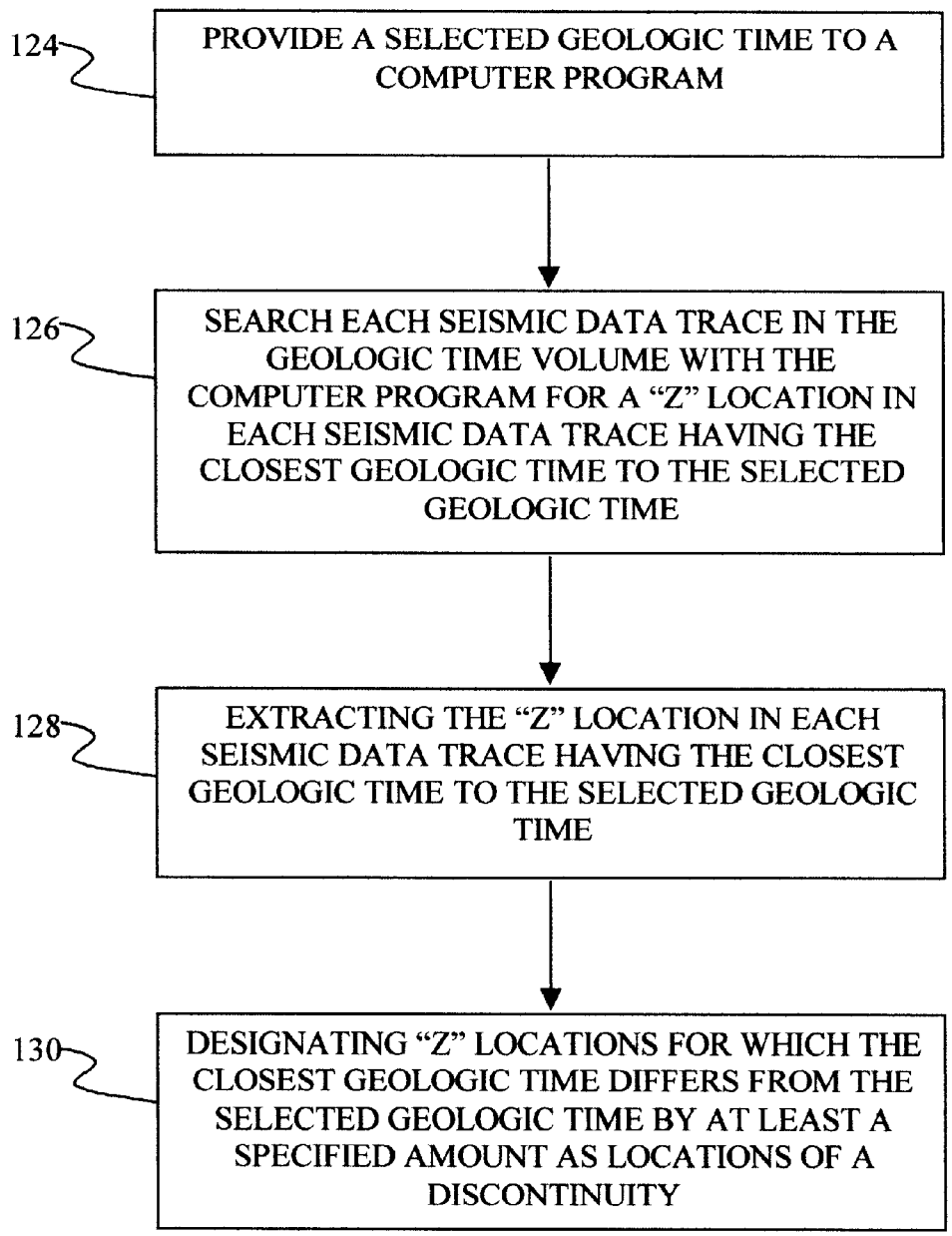
FIG. 14 is a flow chart in accordance with an embodiment of the invention, illustrating a method for utilizing a geologic time volume to estimate the location of discontinuities.

With reference to FIG. 14, in yet another embodiment the invention comprises a method for utilizing a geologic data volume to estimate the locations of discontinuities which includes providing a selected geologic time to a computer program 124, searching each seismic data trace in said geologic time volume with said computer program for a z location in each seismic data trace having the closest geologic time to said selected geologic time 126, extracting said z location in each seismic data trace having the closest geologic time to said selected geologic time 128, and designating z locations for which said closest geologic time differs from said selected geologic time by a specified amount as locations of a discontinuity 130.

While the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

I claim:

1. A method for utilizing a geologic time volume stored on a computer storage medium to investigate a portion of the earth, comprising:

selecting a geologic time;

searching in said geologic time volume, said geologic time volume having data storage locations corresponding to substantially each seismic data sample point of a seismic data volume, and having geologic times stored in said geologic time volume storage locations corresponding to substantially each of said seismic data sample points, for locations having substantially said selected geologic time; and identifying locations having substantially said selected geologic time in said geologic time volume to extract a horizon having substantially said selected geologic time from said geologic time volume.

2. The method of claim 1 further comprising displaying said extracted locations having substantially said selected geologic time.

3. The method of claim 1 wherein extracting horizons having substantially said selected geologic time comprises distinguishing said locations having substantially said selected geologic time from other locations in said geologic time volume.

4. The method of claim 1 wherein extracting horizons having substantially said selected geologic time comprises loading data defining said locations having substantially said selected geologic time into a computer storage device.

5. The method of claim 1 wherein selecting a geologic time comprises:
   selecting an x-y-z location in said geologic time volume, where x represents an in-line position, y represents a cross line position, and z represents a vertical position;
   determining a geologic time associated with said x-y-z location; and
   using said geologic time associated with said x-y-z location as said selected geologic time.

6. A method for utilizing a geologic time volume stored on a computer storage medium to investigate a portion of the earth, comprising:
   selecting an x-y-z location in said geologic time volume, said geologic time volume having data storage locations corresponding to substantially each seismic data sample point of a seismic data volume, and having geologic times stored in said geologic time volume storage locations corresponding to substantially each of said seismic data sample points, where x represents an in-line position, y represents a cross line position, and z represents a vertical position;
   determining a geologic time associated with said x-y-z location;
   using said geologic time associated with said x-y-z location as a selected geologic time;
   searching for locations in said geologic time volume having substantially said selected geologic time; and
   identifying locations having substantially said selected geologic time in said geologic time volume to extract a horizon having substantially said selected geologic time from said geologic time volume.

7. A method for utilizing a geologic time volume stored on a computer storage medium to investigate a portion of the earth, comprising:
   selecting a geologic time;
   searching said geologic time volume for at least one geologic time location having a geologic time substantially equal to said selected geologic time, said geologic time volume having data storage locations corresponding to substantially each seismic data sample point of a seismic data volume, and having geologic times stored in said geologic time volume storage locations corresponding to substantially each of said seismic data sample points;
   modifying said selected geologic time according to preselected criteria;
   searching said geologic time volume for locations having a geologic time substantially equal to said modified selected geologic time; and
   identifying locations having geologic times substantially equal to said modified selected geologic time in said geologic time volume to extract a horizon having substantially said modified selected geologic time from said geologic time volume.

8. The method of claim 7 wherein modifying said selected geologic time according to preselected criteria comprises:
   finding a seismic data location in a said seismic data volume corresponding to said at least one geologic time location;
   searching data points in a seismic data trace including said seismic data location to find a location of a part of a seismic signal wavelet having a selected relationship to said corresponding seismic data location;
   finding a geologic time location in said geologic time volume corresponding to said location of a part of a seismic signal wavelet having said selected relationship; and
   using the geologic time of said corresponding geologic time as said modified selected geologic time.

9. The method of claim 8 wherein said part of a seismic signal wavelet is a zero crossing.

10. The method of claim 8 wherein said part of a seismic signal wavelet is a peak.

11. The method of claim 8 wherein said part of a seismic signal wavelet is a trough.

12. The method of claim 8 wherein said part of a seismic signal wavelet is a selected phase.

13. The method of claim 8 wherein said selected relationship is the closest location of said part of a seismic signal wavelet to said corresponding seismic data location.

14. The method of claim 8 wherein said selected relationship is the closest location of said part of a seismic signal wavelet to said corresponding seismic data location, which closest part is younger in geologic time than the geologic time of said corresponding seismic data location.

15. The method of claim 8 wherein said selected relationship is the closest location of said part of a seismic signal wavelet to said corresponding seismic data location, which closest part is older in geologic time than the geologic time of said corresponding seismic data location.

16. The method of claim 7 wherein modifying said selected geologic time according to preselected criteria comprises:
   searching said geologic time volume for a plurality of geologic time locations having a geologic time substantially equal to said selected geologic time;
   finding seismic data locations in said seismic data volume corresponding to said plurality of geologic time locations;
   searching data points in a plurality of seismic data traces including said seismic data locations to find locations of a part of a seismic signal wavelet having a selected relationship to said corresponding seismic data locations;
   finding geologic time locations in said geologic time volume corresponding to said locations of a part of a seismic signal wavelet having said selected relationship; and
   using each of the geologic times of said corresponding geologic time locations as a modified selected geologic time.

17. A method for utilizing a geologic time volume stored on a computer storage medium to investigate a portion of the earth, comprising:
   loading at least a portion of said geologic time volume into a volume visualization programs, said geologic time volume having data storage locations corresponding to substantially each seismic data sample point of a seismic data volume and having geologic times stored in said geologic time volume storage locations corresponding to substantially each of said seismic data sample points;

selecting a certain geologic time; and varying the opacity of said geologic time volume in response to said selected geologic time to generate a display of locations in said geologic time volume having a geologic time substantially equal to said selected geologic time.

18. The method of claim 17 wherein varying the opacity of said geologic time volume comprises making locations in said geologic time volume transparent which are younger in geologic time than said selected geologic time, and making location in said geologic time volume opaque which are older in geologic time than said selected geologic time.

19. The method of claim 17 wherein varying the opacity of said geologic time volume comprises making locations in said geologic time volume opaque which are younger in geologic time than said selected geologic time, and making location in said geologic time volume transparent which are older in geologic time than said selected geologic time.

20. The method of claim 17 wherein varying the opacity of said geologic time volume comprises making locations in said geologic time volume opaque which are substantially equal to said selected geologic time, and making location in said geologic time volume transparent which are not substantially equal in geologic time to said selected geologic time.

21. A method for utilizing a geologic time volume stored on a computer storage medium to investigate a portion of the earth, comprising:

loading at least a portion of a seismic data volume into a volume visualization program;

selecting a certain geologic time;

searching in said geologic time volume, said geologic time volume having data storage locations corresponding to substantially each seismic data sample point of said seismic data volume and having geologic times stored in said geologic time volume storage locations corresponding to substantially each of said seismic data sample points to detect locations having substantially said selected geologic time; and varying the opacity of said seismic data volume in response to said detected locations to generate a display of locations in said seismic data volume having a geologic time substantially equal to said selected geologic time.

22. A method for utilizing a geologic time volume stored on a computer storage medium to investigate a portion of the earth, comprising:

loading at least a portion of a seismic attribute volume into a volume visualization program selecting a certain geologic time;

searching in said geologic time volume, said geologic time volume having data storage locations corresponding to substantially each seismic data sample point of said seismic attribute volume and having geologic times stored in said geoloaic time volume storage locations corresponding to substantially each of said seismic data sample points to detect locations having substantially said selected geologic time; and varying the opacity of said seismic attribute volume in response to said detected locations to generate a display of locations in said seismic attribute volume having a geologic time substantially equal to said selected geologic time.

23. A method for utilizing a geologic time volume stored in a computer storage medium to investigate a portion of the earth, comprising:

loading at least a portion of said geologic time volume into a volume visualization program, said geologic time volume having data storage locations corresponding to substantially each seismic data sample point of a seismic data volume, and having geologic times stored in said geologic time volume storage locations corresponding to substantially each of said seismic data sample points, selecting a first and a second geologic time;

searching in said geologic time volume to detect locations having a geologic time between said first and second selected geologic times; and varying the opacity of said geologic time volume in response to said detected locations so that the opacity of said geologic time volume between said first and second geologic times is distinguishable from the opacity at other locations in said geologic time volume to generate a display of locations in said geologic time volume having a geologic time in a range between said first geologic time and said second geologic time.

24. A method for utilizing a geologic data volume stored in a computer storage medium to estimate the locations of discontinuities in a portion of earth, said geologic time volume comprising geologic time data representing the geologic times of x-y-z locations of substantially each seismic data sample point of a seismic data volume, wherein x represents an in-line location of a seismic data volume, y represents a cross line location of a seismic data volume and z represents time along seismic data traces in said geologic data volume, comprising:

providing a selected geologic time to a computer program;

searching each seismic data trace in said geologic time volume with said computer program for a z location in each seismic data trace having the closest geologic time to said selected geologic time;

extracting said z location in each seismic data trace having the closest geologic time to said selected geologic time; and designating z location for which said closest geologic time differs from said selected geologic time by at least a specified amount as locations of a discontinuity.

25. A digital computer programmed to utilize a geologic time volume stored in a computer storage medium to investigate a portion of the earth comprising the steps of:

searching for locations in said geologic time volume having substantially a selected geologic time, said geologic time volume having data storage locations corresponding to substantially each seismic data sample point of said seismic data volume, and having geologic times stored in said geologic time volume storage locations corresponding to substantially each of said seismic data sample points; and identifying locations having substantially said selected geologic time in said geologic time volume to extract a horizon having substantially said selected geologic time.

26. A device which is readable by a digital computer having instructions defining the following process and instructions to the computer to perform said process:

searching in a geologic time volume stored in a computer storage medium for locations having substantially a selected geologic time, said geologic time volume having data storage locations corresponding to substantially each seismic data sample point of said seismic data volume, and having geologic times stored in said geologic time volume storage locations corresponding to substantially each of said seismic data sample points; and identifying locations having substantially said selected geologic time in said geologic time volume to extract a horizon having substantially said selected geologic time.

27. A digital computer programmed to utilize a geologic time volume stored in a computer storage medium to investigate a portion of the earth comprising the steps of:

searching said geologic time volume for at least one geologic time location having a geologic time substantially equal to a selected geologic time, said geologic time volume having data storage locations corresponding to substantially each seismic data sample point of said seismic data volume, and having geologic times stored in said geologic time volume storage locations corresponding to substantially each of said seismic data sample points;

modifying said selected geologic time according to preselected criteria;

searching said geologic time volume for locations having a geologic time substantially equal to said modified geologic time; and identifying locations having substantially said selected geologic time in said geologic time volume to extract a horizon having substantially said selected geologic time.

28. A device which is readable by a digital computer having instructions defining the following process and instructions to the computer to perform said process:

searching a geologic time volume stored in a computer storage medium for at least one geologic time location having a geologic time substantially equal to a selected geologic time, said geologic time volume having data storage locations corresponding to substantially each seismic data sample point of said seismic data volume, and having geologic times stored in said geologic time volume storage locations corresponding to substantially each of said seismic data sample points;

modifying said selected geologic time according to preselected criteria;

searching said geologic time volume for locations having a geologic time substantially equal to said modified geologic time; and identifying locations having substantially said selected geologic time in said geologic time volume to extract a horizon having substantially said selected geologic time.

\* \* \* \* \*